United States Patent [19]

Campman et al.

[11] Patent Number: 4,513,625
[45] Date of Patent: Apr. 30, 1985

[54] FLOW METER AND DENSITOMETER APPARATUS AND METHOD OF OPERATION

[75] Inventors: Keith S. Campman; William B. Ernst, both of Tulsa, Okla.

[73] Assignee: The Dow Chemical Company, Midland, Mich.

[21] Appl. No.: 509,478

[22] Filed: Jun. 30, 1983

[51] Int. Cl.³ .............................................. G01F 1/28
[52] U.S. Cl. .................................................. 73/861.72
[58] Field of Search ............. 73/32 R, 861.02, 861.03, 73/861.69, 861.71, 861.72

[56] References Cited

U.S. PATENT DOCUMENTS

| 2,804,771 | 9/1957 | Brown | 73/861.72 |
| 3,096,646 | 7/1963 | Peirce | 73/861.72 |
| 3,584,508 | 6/1971 | Shiba | 73/861.72 |

*Primary Examiner*—Herbert Goldstein

[57] ABSTRACT

The instrument disclosed herein is designed for measuring flow rates and densities of moving fluid streams, including liquids, gases, slurries, and fluids which contain solid materials. Basic components of this instrument are a dynamic leg and a static leg, and flexible connections in each leg which allow for displacement caused by the force of the moving fluid. Each leg is defined by a conduit member having several bends therein, which are joined by straight sections. The legs are held in physical contact along one of the straight sections, and a displacement transducer unit is installed at this point. In operation, part of the incoming fluid to be measured for flow rate fills the static leg and remains in this leg. After the static leg is full, all of the incoming fluid moves through the dynamic leg, and fluid pressure is in equilibrium within the system. This removes the effect of fluid pressure on the flow rate and density measurement, so that the displacement transducer senses and records only the force generated by the moving fluids. Flow rate is then calculated as a function of this force. A separate transducer measures the velocity of the stream, and this measurement is converted to a density value.

13 Claims, 3 Drawing Figures

FLOW METER AND DENSITOMETER APPARATUS AND METHOD OF OPERATION

BACKGROUND OF THE INVENTION

The invention relates to an apparatus and method for measuring the flow rate and density of moving fluid streams. More specifically, the apparatus and method is designed to measure the force of a moving fluid stream, and to independently measure the velocity of the stream. From these values, the flow rate and density can be derived.

Many operations in the chemical industry, in the recovery of oil and gas from earth formations, and in other industrial processes, require measuring the flow rate and/or the density of a moving fluid stream. The usual fluid streams are liquids, gases, and slurries, or liquids and gases which contain solid materials. There are several different types of conventional instruments now available for measuring flow rates and densities of fluid streams.

Flow meters are generally classified as the "intrusive" type or "non-intrusive" type. In the operation of intrusive flow meters, certain components of the instrument are placed directly in the moving fluid stream, so that this part of the instrument is subjected to the erosive effect of the stream at all times. Conversely, the non-intrusive flow meters are instruments in which the flow measuring components are not inserted directly into the moving stream, so that the erosive effects of the stream are minimized.

A turbine flow meter is an example of a conventional intrusive-type flow meter. The turbine structure is an axial mounted rotor. The rotor is placed inside the pipeline which carries the fluid stream to be measured, so that the stream must pass directly through the rotor. This causes the rotor to turn and the rotor blades induce an AC current in the coil surrounding a permanent magnet in the pickup. The frequency of the AC signal is directly proportional to the liquid velocity. With proper calibration, the output frequency can be used for direct flow rate indication.

The instrument described above, as well as many other commercially available instruments, have certain drawbacks which make them impractical for measuring flow rates of moving fluids in many commercial operations. For example, in some oil well servicing operations, viscous liquids or slurry compositions are injected into the wellbore under high pressure and high velocity. The use of turbine flow meters in these operations has been generally unsatisfactory. For example, the rotor bearings often fail; but a more serious problem is that the space between the rotor and the housing becomes clogged. When this happens, the entire rotor structure can either break loose from the housing, and be carried into the wellbore by the moving fluid, or it becomes seized in the housing and the moving slurry "wormholes" the housing wall until a serious failure occurs.

The apparatus of this invention has a distinct advantage over the prior devices. For example, none of the parts of this instrument are inserted into the moving fluid stream which is being measured for flow rate, so that this instrument is a non-intrusive flow meter. In addition, the present apparatus is also capable of measuring the density of moving fluid streams, so that it can function both as a flow meter and a densitometer.

SUMMARY OF THE INVENTION

The apparatus of this invention is designed for measuring the flow rate and density of moving fluid streams, such as liquids, gases and liquids or gases which have solid materials suspended in the stream. Basically, the apparatus is made up of a dynamic leg and a static leg. Each leg is a conduit member having several bends therein joined by several straight sections. The dynamic and static legs (conduits) are in contact with each other along one straight section of each conduit member, and a force measuring means is positioned at a point of contact. The apparatus also includes flexible connections, which are installed in straight sections of each conduit member. In the embodiment illustrated herein, the flexible connections are installed upstream from the point at which the dynamic leg and static leg are in contact, and downstream from this point.

In the operation of this apparatus, the first part of a fluid stream to be measured for flow rate is passed through the dynamic leg. At the same time, the second part of the fluid stream is passed into the static leg, which has a closed end, so that the fluid is retained in the leg. The retained fluid exerts a pressure equal to the pressure of the fluid in the dynamic leg, so that the effect of fluid pressure is removed from the system. However, as the first part of the fluid stream moves through the dynamic leg, its motion causes an unbalancing force which displaces the point of contact (the equilibrium point) between the dynamic leg and static leg. With the effect of pressure being removed, therefore, this unbalancing force is sensed and recorded by the force measuring means. The flow rate of the moving stream can then be derived as a function of the force.

The apparatus also includes a separate means, such as an ultrasonic transducer unit, for measuring the velocity of the first part of the fluid stream which passes through the dynamic leg. In the embodiment shown herein, the transducer device is installed on the outer wall surface of the dynamic leg above the point of contact with the static leg. The density of the stream flowing through the dynamic leg can then be derived as a function of the velocity and the force.

DESCRIPTION OF THE INVENTION

Figure 1:
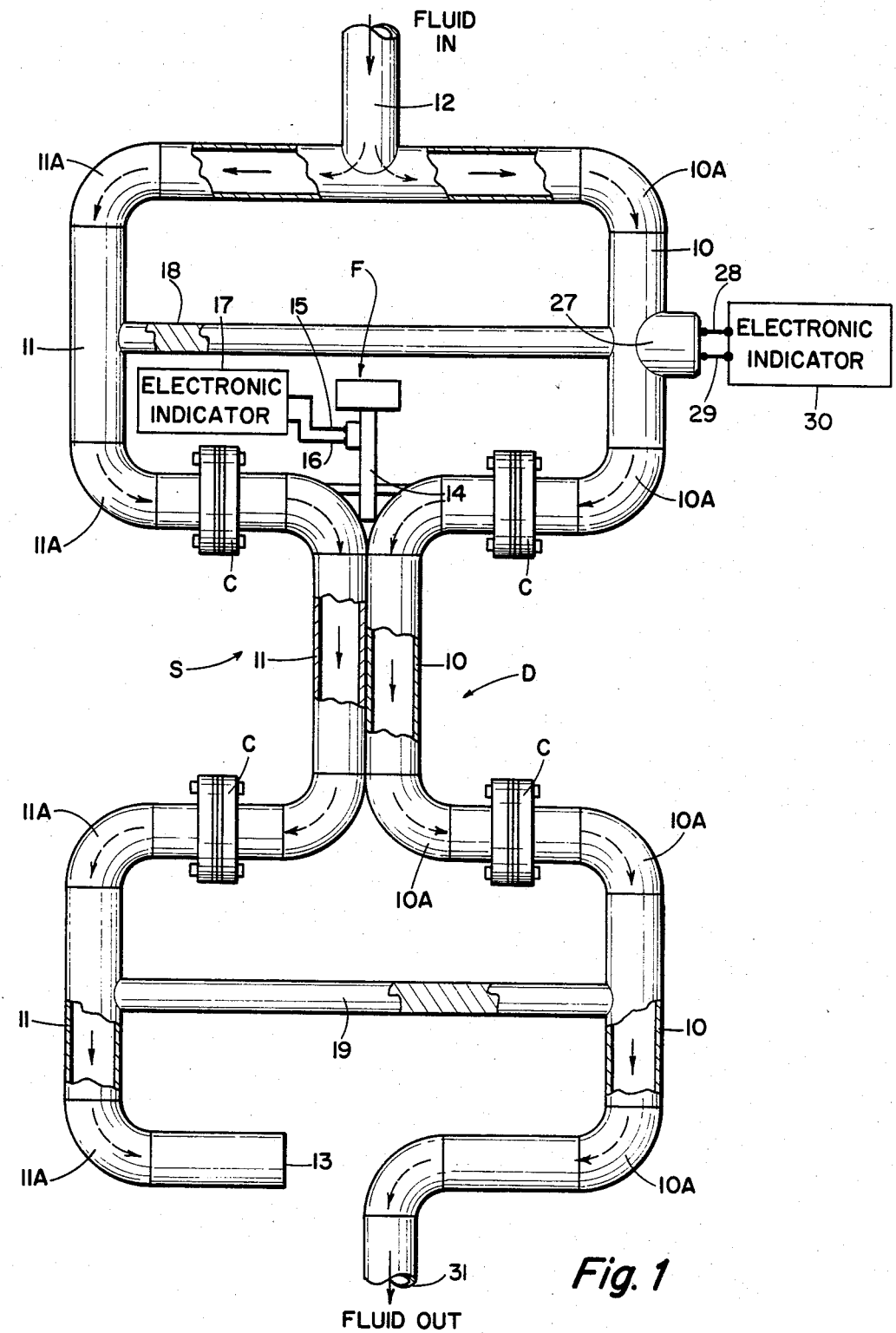
FIG. 1 is a plan view, partly in section, and in schematic illustration, of one embodiment of a flow meter and density apparatus of this invention.

Referring to the drawings, particularly to FIG. 1, the flow meter and densitometer apparatus of this invention is generally made up to two basic components. These components are a dynamic leg, indicated generally by letter D, and a static leg, indicated generally by the letter S. Both of the legs are defined by conduit members which have the same shape, that is, the entire apparatus has a symmetrical construction. Specifically, each leg is of a generally serpentine configuration, in which there are several bends joined by several straight sections. In FIG. 1 the straight sections of the dynamic leg D are designated by numeral 10 and the bends in the leg by numeral 10a. For the static leg S, the numeral 11 refers to the straight sections and numeral 11a to the bends in the leg.

As shown in FIG. 1, the dynamic leg D and static leg S are in physical contact with each other along one of the straight sections of each leg. The actual point of contact is at the center of the flow meter apparatus, so that the symmetry of this system, as mentioned earlier, is maintained. In the practice of this invention, the usual procedure is to install a flow meter apparatus in a pipeline, or some other conduit which carries a fluid composition from a storage source to a use point, or a disposal point. The pipeline is not shown in the drawings.

In transferring fluid from one point to another, the fluid enters the flow meter through a tee connection 12. At the tee connection, the fluid stream splits, with part of the stream being diverted into the static leg S and part of it into the dynamic leg D. The opposite end of the static leg, as indicated by numeral 13, is closed. The static leg is closed off, so that the fluid which enters this leg will fill it up, rather than passing through it. The other part of the fluid stream, that is, the part which enters the dynamic leg D, provides a flowing fluid which can be measured for flow rate and density as it passes through the dynamic leg.

As shown in FIG. 1, the bends in both the dynamic leg D and the static leg S are 90 degree bends. These bends are made in a 90 degree configuration to provide sharp turns in the flow meter device. The sharp turns cause the fluid flowing through the dynamic leg to generate its maximum force vector as it flows around the turns. In actual practice, it is not critical to use 90 degree bends in the flow meter apparatus of this invention. The bends may be shaped to any angle which is desired, so long as the flow meter meets the other requirements described herein. A general rule to be applied in determining the angle of the bends, is to assume that the force factor of the flowing stream will increase or decrease in direct proportion to the size of the angle.

In the practice of this invention, the objective is to be able to measure the force generated by the fluid which moves through the dynamic leg D. At high pressures the walls of the metal conduits which define the flow meter device must be thick enough to contain the pressurized fluid, and thus these walls are very resistant to bending and elongation. In turn, this resistance must be minimized because the effects of the pressure and the material properties of the metal are much greater than the effects of the force of the fluid stream we want to measure. The effects of the fluid pressure are negated by balancing the pressure against itself. In addition, the sections of the metal conduits are connected by flexible connections, which include high pressure diaphragms. These diaphragms, which are very stiff in the radial direction and which are quite capable of withstanding the internal pressure, greatly reduce the strong effects of the material properties of the metal conduits. The diaphragms are also flexible in the axial direction and will respond to small force inputs. The structure and operation of the diaphragms, which is explained in more detail later in this description, thus provide the key to the successful operation of the flow meter of this invention.

A typical force measuring means is provided by a conventional displacement transducer, indicated generally by the letter F in FIG. 1. In the drawing, the transducer unit is illustrated only schematically. The basic transducer includes a cantilever beam sensor 14, which is positioned at the point of contact of the dynamic leg with the static leg. The beam sensor 14 is connected by electrical leads 15 and 16 into an electronic indicator 17. The output from indicator 17 is transmitted to a computer system (not shown). In practice, any of various force measuring devices may be used, such as differential force cells, fiber optics, or LVDT.

The apparatus of this invention also includes a means for restraining the two legs with respect to each other, that is, the restraint prevents the legs from pulling away from each other due to deformation from the effects of the fluid pressure. In the embodiment illustrated in FIG. 1, the restraint means consists of a solid rod 18, which ties the dynamic leg and the static leg together above the point of contact, and a similar solid rod 19, which ties the legs together below the point of contact. The objective in holding the legs together with the restraint means is to maintain the bends in each leg at a 90 degree angle, so that the fluid moving through the flow meter apparatus generates its maximum force vector as it rounds each 90 degree turn. In the practice of this invention, any suitable tying device or other means which can hold the legs in the restraining position shown, may be used.

As mentioned earlier, the present flow meter apparatus includes several flexible connections, as indicated generally by the letter C. In the embodiment illustrated herein, there are two flexible connections in the dynamic leg D and two in the static leg S. One of the flexible connections in each leg is installed in the straight section of the leg upstream from the point of contact, and the other flexible connection is in the straight section downstream from the point of contact. The function of the flexible connections is to allow movement of each leg in the direction of the fluid flow, and in response to the force acting on each leg. To explain further, the conduit members which define the legs of the flow meter apparatus are constructed of a rigid and durable material, preferably metal, which is capable of absorbing the force generated by the moving fluid. Without the flexible connections C, therefore, the movement of the rigid material would be so slight as to make it extremely difficult for the transducer F to sense this movement.

Figure 2:
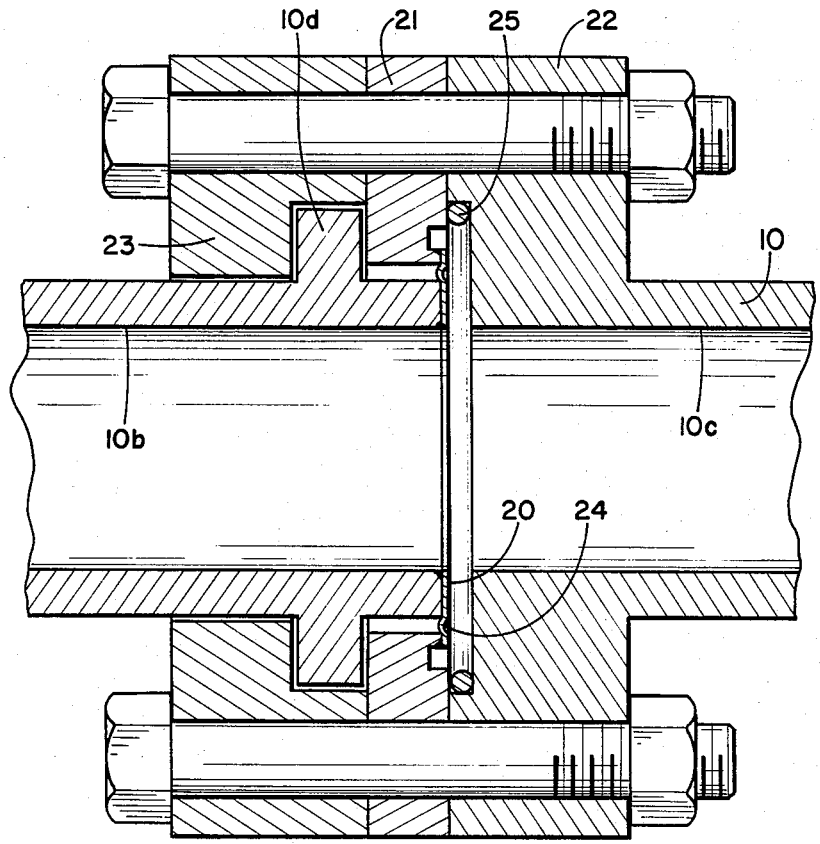
FIG. 2 is an enlarged detail view, in section, of one of the several flexible connections which are installed in the apparatus illustrated in FIG. 1.

The actual structure of each of the flexible connections C is best illustrated in the detail view of FIG. 2. For the purpose of this description, assume that the structure illustrated in FIG. 2 is the flexible connection on the dynamic leg D which is installed in the straight section 10 upstream from the point of contact of the dynamic leg with the static leg. Referring to FIG. 2, the straight section in which the flexible connection is installed is split, so that it consists of two separated subsections. In the drawing, the subsection on the left is designated by numeral 10b and the one on the right by numeral 10c.

The flexible joint is formed by a diaphragm 20. The diaphragm is welded at its outside diameter to a diaphragm ring 21 and along its inside diameter, it is welded to the end of the subsection 10b. The subsection 10b includes an ear member 10d, and the subsection 10c has a flange 22 thereon. The diaphragm ring 21 fits between the flange 22 and ear member 10d, and is held in place by a displacement limiting collar 23, which seats against the ear and the ring and is bolted to the flange. A groove or channel 24 is defined in the end of flange 22 and a metal O-ring seal 25 is positioned in this groove. When the flow meter is in use, the pressure of the fluid within each leg is enough to force the joint slightly apart so that fluid can move toward the outside edge of the diaphragm. The O-ring prevents undesirable fluid loss, particularly when the fluid pressure is at a high level.

Figure 3:
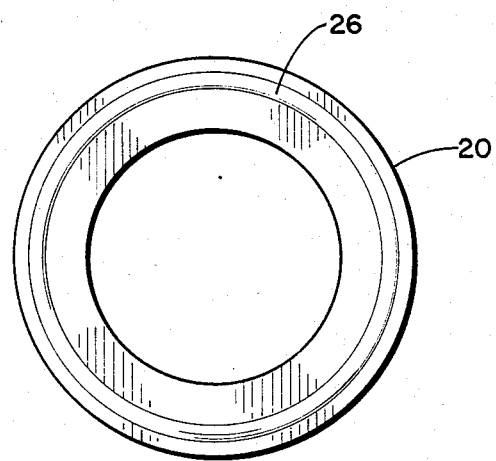
FIG. 3 is an enlarged detail view, in front elevation, of one of the flexible diaphragm members which make up the major part of each flexible connection.

FIG. 3 is an enlarged detail view, in front elevation, of the flexible diaphragm 20 shown in FIG. 2. The diaphragm member 20 has a central rib 26 thereon, which is defined by a convex depression in the diaphragm. The several diaphragm members in the flow meter apparatus are each fabricated with the rib 26 to provide additional strength for withstanding high pressure service, for example, where the pressure is above about 1000 psi.

The present apparatus also includes a means for measuring the velocity of the part of the fluid stream which moves through the dynamic leg D. Any of the conventional devices designed for measuring velocity of fluid streams may be used for this purpose, such as certain types of transducer units, non-intrusive flow meters, and the like. One type of velocity measuring device 27, which is illustrated schematically in FIG. 1, is an ultrasonic Doppler transducer unit. The transducer 27 is mounted on the outer wall surface of one of the straight sections of the dynamic leg D. Electrical leads 28 and 29 connect the transducer device into an electronic indicator 30. In the practice of this invention, the output from indicator 30 is transmitted to a computer system (not shown).

Operation

The present invention can be illustrated by describing certain operations in which the flow rate and density of moving fluid streams are measured. Typically, this apparatus is used to measure the flow rate and density of a fracturing slurry, which is usually a viscous liquid laden with sand. Fracturing slurries are pumped into oil or gas wells, usually under high pressure, to initiate fracturing of a producing earth formation and thus enhance recovery of the oil or gas.

Referring to FIG. 1, the slurry composition is pumped into the apparatus through the tee connection 12 from a pumper unit (not shown). From the tee connection, the slurry stream splits, with part of it passing into the static leg S and part of it passing through the dynamic leg D. As explained earlier, that part of the fluid which passes into the static leg S fills up the leg, because of its closed end 13, so that this fluid remains in the leg as a "static" fluid. Once the static leg S is filled with fluid, all of the fluid then flows completely through the dynamic leg D and is discharged through the fluid outlet end 31, from which it is carried to the wellhead (not shown), or some other use point.

When the static leg S is completely full of fluid, the fluid pressure in the static leg is in equilibrium with the fluid pressure in the dynamic leg D. As explained earlier, this pressure equilibrium condition removes the effect of the pressure factor on the flow rate measurement of the moving fluid in the dynamic leg D. By removing the pressure factor, the flow rate of the stream moving through the dynamic leg D can be determined by first measuring the force which this moving fluid generates and then calculating the flow rate as a function of the force. To explain further, as the fluid moves around the bend in the dynamic leg D, which is on the downstream side of the first flexible connection C, the diaphragm member in this connection is displaced in proportion to the force. This displacement is sensed by the displacement transducer F in the form of an electrical signal, which is transmitted to indicator 17. The output from the indicator is carried into a computer system (not shown), which derives the flow rate as a function of the force. An appropriate equation for deriving the flow rate is:

$$Q \propto \sqrt{F} \qquad \text{(Eq. 1)}$$

where
Q = flow rate
F = force at each 90° bend.

Along with its capability for measuring the flow of a moving fluid stream, the apparatus is also designed for measuring the density of the moving stream. As the fluid in the dynamic leg D flows past the transducer 27, the transducer measures the velocity of the moving stream. In turn, the transducer signal is picked up by the electronic indicator 30, and from there into a computer system (not shown). From the velocity data and the force data, as explained above, the computer derives the density values according to the following equation:

$$D \propto F \qquad \text{(Eq. 2)}$$

where
D = density
F = force.

The flow rate and density equations, as set out above, are a form of the general equation for a curved vane, which can be found in standard engineering handbooks and other reference material.

Certain details regarding the materials of construction and general operating conditions will now be described. These details further describe the structure and operation of the flow meter and densitometer apparatus disclosed herein but they are not intended to limit the practice of the invention. The flexible diaphragm 23 is preferably constructed of a thin, flexible metal. Suitable metals for the diaphragm include stainless steel, non-ferrous metal, ferrous metals and plastic resins.

The thickness of the diaphragms will depend primarily on the maximum fluid pressure to which they are subjected in the flow meter apparatus. As a general rule, the diaphragms should be as thin as possible, to provide maximum sensitivity to the pressure in the system, but at the same time, they must be durable enough to withstand the pressure. Another requirement for the diaphragms is that they must be compatible with the fluids which are passed through this apparatus. In the practice of this invention, the fluid pressures within the flow meter apparatus could run as high as 20,000 psig, or more, and the flow rates could be as high as 50,000 SCFM. As described above, the apparatus of this invention is used to measure flow rate and density of a stream (fracturing slurry) which comprises a liquid phase and a solid phase. In practice, this apparatus can also be used to measure flow rate and density of streams which contain only a liquid phase, only a gaseous phase, or a mixture of a liquid phase, a gaseous phase, and a solid phase.

The invention claimed is:

1. A mass flow meter apparatus, for measuring the flow rate of a fluid stream, the apparatus comprising:
   a dynamic leg defined by a first conduit member having an inlet end and an outlet end, the first conduit member has several bends therein, and the bends are joined by several straight sections of the first conduit member;

a static leg defined by a second conduit member having an inlet end and a closed end, the second conduit member has several bends therein, and the bends are joined by several straight sections of the second conduit member;

the first conduit member and second conduit member are in contact with each other along one straight section of each conduit member;

a force measuring means is positioned at a point of contact between the first and second conduit members;

the first and second conduit members each have one straight section positioned upstream from the point of contact of said conduit members, one straight section positioned downstream from said point of contact, and each of said straight sections have a flexible connection therein; and wherein the first conduit member is adapted for carrying the first part of a fluid stream from the inlet end, through the conduit member, and discharging the stream through the outlet end;

the second conduit member is adapted for carrying the second part of said fluid stream from the inlet end into the conduit member, where the fluid is retained, whereby said retained fluid exerts a fluid pressure equal to the fluid pressure of the first part of the fluid stream; and the first part of the fluid stream exerts a force, caused by its flowing motion through the first conduit member, which force is sensed and recorded by the force measuring means, and the flow rate of said first part of the fluid stream is then derived as a function of said force.

2. The apparatus of claim 1 which further includes a means which connects the dynamic leg and static leg together, for restraining movement of the legs away from each other.

3. The apparatus of claim 1 in which the force measuring means is a displacement transducer unit.

4. The apparatus of claim 1 in which the bends of the first and second conduit members are 90 degree bends.

5. The apparatus of claim 1 in which the flexible connection in each of the recited straight sections comprises a structure in which:

the straight section in which the flexible connection is installed is defined by at least two separated subsections, the ends of each subsection are in opposing relation, a flexible diaphragm member is attached to the end of one subsection, such that said diaphragm member is positioned between said opposing subsections.

6. The apparatus of claim 5 in which the flexible diaphragm member is defined by a thin metal ring, the ring has a central rib thereon, and the ring has an opening therein which is aligned with the bore of each of the opposing conduit subsections.

7. The apparatus of claim 1 which further includes a means for measuring the velocity of the first fluid stream, and the velocity measuring means is attached to one of the straight sections of the first conduit member, such that the density of the fluid stream can then be derived as a function of the velocity and the force of said first fluid stream.

8. A method for measuring the flow rate of a fluid stream, comprising the steps of:

flowing the first part of a fluid stream through a first conduit member, the first conduit member has an inlet end and a closed end, it has several bends therein, and the bends are joined by several straight sections of the first conduit member;

flowing the second part of a fluid stream into a second conduit member, the second conduit member has an inlet end and an outlet end, it has several bends therein, the bends are joined by several straight sections of the second conduit member, and the first conduit member and second conduit member are in contact with each other along one straight section of each conduit member;

retaining the second part of the fluid stream in the second conduit member, to exert a fluid pressure in the second conduit member which is equal to the fluid pressure exerted by the first part of the fluid stream in the first conduit member;

installing a force measuring means at the point where the first and second conduit members are in contact;

causing the force measuring means to sense and record the force generated by the first part of the fluid stream, which force is caused by the flowing motion of said first part of the fluid stream, and thereby measuring said force with the force measuring means; and deriving the flow rate of the first part of the fluid stream as a function of the force of said first part of the fluid stream.

9. The method of claim 8 which further includes the steps of:

attaching to the first conduit member a means for measuring the velocity of the first part of the fluid stream;

recording the velocity of the first part of the fluid stream, as it moves through the first conduit member; and thereafter deriving the density of said first part of the fluid stream, as a function of the velocity and force of said stream.

10. The method of claim 8 or 9 in which the first fluid stream is a liquid phase substance.

11. The method of claim 8 or 9 in which the first fluid stream is a gaseous phase substance.

12. The method of claim 8 or 9 in which the first fluid stream is a liquid phase substance which contains solid matter.

13. The method of claim 8 or 9 in which the first part of the fluid stream is a mixture of a liquid phase, a gaseous phase, and a solid phase.

* * * * *